2,834,762
POLYMERIZATION OF BUTYL RUBBER

Charles A. McKenzie and Robert F. Killey, Sarnia, Ontario, Canada, assignors to Polymer Corporation Limited, Sarnia, Ontario, Canada, a corporation of Canada No Drawing. Application December 27, 1954
Serial No. 477,920

2 Claims. (Cl. 260—85.3)

This invention relates to the low temperature polymerization of olefinic materials, and, more particularly, of isoolefins with or without diolefins. One of the most common applications of the invention will be the low temperature polymerization of isobutylene, generally in admixture with a conjugated diolefin such as isoprene.

In the conventional method of producing polymers of isobutylene or copolymers of isobutylene and a diolefin, such as isoprene, the reaction is conducted in the presence of an inert diluent such as methyl or ethyl chloride and a Friedel-Crafts catalyst such as aluminum chloride at temperatures in the range of —120° F. to —150° F. The preferred practice is a continuous process whereby flows of feed and catalyst solution, precooled to the reaction temperature, are maintained to a refrigerated vessel equipped to provide internal agitation. The reactor contents are allowed to overflow into warm water causing the unreacted monomers and the diluent to volatilize, causing the catalyst to be deactivated and leaving a slurry of polymer in water. A suitable anti-agglomerant is added in the flash tank to maintain discrete particles of polymer which may be readily transferred through pipes to the finishing process where it is filtered, dried, milled into a relatively smooth sheet suitable for packaging.

It is well-known that superior polymers are to be obtained at lower temperatures. Moreover, polymers produced at the low temperatures are less tacky and, therefore, less inclined to agglomerate or to adhere to the internal surfaces of the reactor. In commercial operations the inside reactor surfaces become coated with a thin film of polymer in the course of several hours of reaction, thereby reducing the heat transfer coefficient of the refrigerating heat exchange surface, and heat exchange becomes increasingly difficult. Since in present practice the temperature of the refrigerant in the reactor jacket is maintained relatively constant, the reactor temperature must rise in order that the relatively constant reactor heat load can be dissipated. When the reaction temperature rises to a point where polymer of desired quality can no longer be produced, the reaction is terminated. The reactor is then emptied and cleaned in preparation for a further production run.

According to the prior art the maximum agitation consistent with low horsepower input was desired. A rate of circulation of 13 or 14 feet per second was a common minimum. By maintaining high rates of flow across the reactor cooling surfaces and by maintaining maximum turbulence, fouling of the surfaces was said to be reduced. The maximum turbulence and thorough distribution of catalyst reduced localized increases in temperature and formation of relatively low molecular weight tacky polymer, and high rates of flow reduced the tendency of the polymer to cling to the reactor surfaces.

U. S. Patent No. 2,529,318 suggests a method for reducing the fouling of the reactor by effecting the polymerization reaction at a temperature sufficiently low that a frozen film, normally entirely or almost entirely of the diluent, is formed on the inner surface of the reactor, especially on the refrigerating heat exchange surface. The polymer appears to have far less tendency to foul this frozen film. This prior patent suggests that the frozen film is continuously melted and reformed by fluctuations in the temperature of the reaction mixture and that every melting leaves unsupported any polymer deposit thereon which deposit is then carried off by the circulating mixture. This prior patent follows the previous teachings in the art and stresses the need for a rapid circulation of the reaction mixture to limit polymer deposit. It is stated that any fouling of the refrigerating heat exchange surface, while the frozen film is at intervals temporarily melted, is immaterial since the run will usually be terminated by fouling of the propellor stirrer or reactor head before polymer deposit on the refrigerating heat exchange surface becomes troublesome.

The present invention may be considered as an improvement on the method suggested in U. S. Patent No. 2,529,318 and is based on the discovery that fouling of the reactor system may be still further reduced, and hence a longer run obtained and/or higher concentrations of monomer and polymer can be permitted, by maintaining the frozen film on the refrigerating heat exchange surface throughout the reaction and preventing appreciable erosion of this film during the reaction.

The maintenance of the frozen film, in other words the prevention of any periodic melting of the film, may be effected by keeping the reaction mixture at a low enough temperature.

The erosion may be substantially prevented by operating completely contrary to the general prior teaching in the art and using a reduced speed of circulation of the reaction mixture. The present inventors have made the very surprising discovery that using a reduced speed of circulation with the present invention reduces fouling, and not increases fouling as might have been expected. The reason for this fact is not entirely clear but it is believed that a rapid circulation such as is suggested in U. S. Patent No. 2,529,318 erodes the frozen film and dislodges and carries away particles of this frozen film which increase the viscosity of the reaction mixture to such an extent that the propellor stirrer becomes overloaded, local heat is generated, the reaction mixture becomes sluggish, polymer is deposited particularly on the propellor stirrer, and eventually the whole system becomes coagulated. According to the present invention, the rate of circulation is sufficient to ensure substantially uniform dispersion and distribution of the reactor contents and evolved heat, but not great enough to cause appreciable erosion of the frozen film during the reaction. A speed of not more than 8 feet per second is suitable, preferably not less than 4 feet per second. A speed of 7 feet per second may be considered the optimum.

General details of most of the other aspects of the process are not really necessary in this specification since these already form part of the prior art knowledge. Some description of further details of the process will however now be given.

In the preferred practice of the invention the known general construction of reactor is employed with a centrally located draft tube through which the reaction mixture is propelled and tubular or annular return ducts. The external shell of the reactor is refrigerated as are the draft tube and return ducts. Liquid ethylene may be conveniently employed as the refrigerant which is evaporated at sub-atmospheric pressures as necessary to maintain the desired temeprature.

The monomers may consist of high purity isoolefins of 4 to 8 carbon atoms together with minor quantities of multi-olefins selected from the group containing 4–14 carbon atoms and at least 2 carbon to carbon double bonds. While the multi-olefin can comprise as much as 50% by weight of the total monomers, in the more importantly commercially produced polymers diolefins range from 1 to 5% on the isoolefin. Large quantities of a low freezing diluent are also employed. This will normally be a solvent for the monomers and catalyst but non-solvents for the polymer. Alkyl halides, such as methyl chloride, are the most widely used. When it is stated that the diluent is a solvent for the monomers or catalyst, this includes the case of the diluent being miscible in a solution of the monomer or catalyst in some other liquid, and the claims are to be so construed. While the percent of reacted and reactive hydrocarbon with respect to the diluent may vary over a wide range, 20–35% by weight is common. At the lower temperatures higher concentrations may be employed.

The preferred catalyst is aluminum chloride, but any of the known Friedel-Crafts catalysts may be used, the choice to some extent being influenced by the nature of the diluent and/or catalyst solvent. A dilute solution of the catalyst is prepared in a low freezing non-complex forming solvent, e. g. aluminum chloride may be dissolved in methyl chloride. The concentration of the catalyst solution in the range of .05 to 1.0% is practicable.

As a specific example, a mixed feed comprising isobutylene, isoprene, and methyl chloride is precooled and charged to the refrigerated reactor. The temperature is adjusted to the range from −150° F. to −180° F. or lower to provide a frozen film. Methyl chloride has a freezing point of −144° F. but the freezing point is suppressed by the lower freezing hydrocarbons in the mixture. The greater the concentration of such hydrocarbon the lower the temperature at which the frozen film will form. Circulation, with resultant agitation, is initiated at a rate of about 7 feet per second and catalyst injection is begun. The polymer formed is recovered in the normal manner by coagulation in hot water.

An important aspect of the present invention is the reduced amount of horsepower required for the propeller stirrer to give the reduced circulation. This in turn substantially reduces the localised heat given to the reaction mixture by the propeller stirrer, which localised heat is a major factor in causing fouling of the propeller stirrer with the prior art operations. The following table shows the much lower horsepower which is required for a circulation of 4, 6 and 8 feet per second as compared with the required horsepower for 11½ feet per second. Even the latter rate is substantially lower than the normal rate used in the prior art operations.

| Velocity, ft./sec. | Motor Speed, R. P. M. | Required Power, H. P. |
| --- | --- | --- |
| 4 | 225 | 4½ |
| 6 | 315 | 13 |
| 8 | 425 | 30 |
| 10 | 540 | 60 |
| 11½ | 600 | 92 |

The following example illustrates the advantages of the present invention:

*Example*

A series of reactions were run at two reactor jacket temperatures and various slurry concentrations. Flow rates in the draft tube were in the range of 6–8 ft./second. It is appreciated that means of measurement of flow rates are not exact due to a spiral motion imparted by the propeller. Results set out in the table demonstrate that low temperatures in combination with lower than conventional rates of agitation permit increased slurry concentrations and reduced polymer film formation on the cooling surfaces.

| Run | Jacket Temp., ° F. | Calculated Slurry Concentration, percent | Run Length, Hours | Percent Increase in ΔT | Remarks |
| --- | --- | --- | --- | --- | --- |
| A | −150 | 18 | 7 | 30 | Power increase—polymer deposit on impeller and cooling surfaces. |
| B | −150 | 18 | 11¼ | 40 | Propellor plugged with polymer; polymer film on cooling surfaces. |
| C | −150 | 19 | 10½ | 10 | Propellor imbedded in polymer. |
| D | −150 | 20 | 9¼ | 30 | Film of hard polymer on cooling surfaces. |
| E | −170 | 27 | 10½ | 0 | Uniform ice film on cooling surfaces—free of polymer film. |
| F | −170 | 25 | 12½ | 0 | Catalyst nozzle frozen—ice film on cooling surfaces. |
| G | −170 | 24 | 10½ | 0 | Terminated by refrigeration failure on feed. |
| H | −170 | 23 | 11½ | 0 | Catalyst nozzle frozen. |
| I | −160 | 21 | 11 | 0 | Voluntary termination, good ice film—no polymer film. |

All runs at jacket temperatures below −150° F. were terminated voluntarily or for reasons not associated with increase in ΔT which is the difference in temperature across the refrigerating heat exchange surface.

Finally, it may be stated that, in general, the maximum temperature of the jacket is the highest temperature compatible with the maintenance of the ice film, e. g. a temperature 5 to 10 F. degrees below the freezing point of the reactor mix, and the preferred minimum temperature is 20 F. degrees below the maximum temperature.

We claim:

1. In a low temperature polymerization reaction which includes the steps in combination of mixing together a major proportion of isobutylene and a minor proportion of a conjugated diolefin hydrocarbon containing 4–6 carbon atoms together with a non-polymerizable diluent having a freezing point sufficiently near to the polymerization temperature to permit the freezing out of a layer containing frozen diluent, cooling the resulting liquid feed mixture to a temperature within the range between −40° C. and −164° C., by the application thereto of refrigeration from a refrigerating jacket, polymerizing the mixture by the application thereto of a catalyst solution of a Friedel-Crafts catalyst dissolved in a low-freezing non-complex forming solvent and adjusting the temperature of the refrigerant to such a value as to freeze out on the wall of the jacket a solid layer containing frozen diluent from the reaction mixture prior to and during the time of application of catalyst to the cold mixture to ensure a continuous layer containing frozen diluent thereon, the improvement which comprises effecting such polymerization by circulating the reacting mass at a flow rate of at least 4 feet per second but less than 8 feet per second.

2. In a low temperature polymerization reaction which includes the steps in combination of mixing together a major proportion of isobutylene and a minor proportion of isoprene together with methyl chloride diluent, cooling the resulting liquid feed mixture to a temperature within the range between −40° C. and −164° C., by the application thereto of refrigeration from a refrigerating jacket, polymerizing the mixture by the application thereto of a catalyst solution of aluminum chloride dissolved in methyl chloride, and adjusting the temperature of the refrigerant to such a value as to freeze out on the wall of the jacket a solid layer containing frozen diluent from the reaction mixture prior to and during the time of application of catalyst to the cold mixture to ensure a continuous layer containing frozen diluent thereon, the improvement which comprises effecting such polymerization by circulating the reacting mass at a flow rate of at least 4 feet per second but less than 8 feet per second.

References Cited in the file of this patent

UNITED STATES PATENTS 2,529,318    Tegge  --------------- Nov. 7, 1950